United States Patent
Hoffman et al.

(10) Patent No.: US 7,612,527 B2
(45) Date of Patent: Nov. 3, 2009

(54) COMMUNICATIVE AND VIRTUAL BATTERY CHARGERS AND METHODS

(75) Inventors: Peter F. Hoffman, Avon, OH (US);
Michael J. Brandon, II, North Ridgeville, OH (US); Jennifer Ana Moffat, Chesterfield, MO (US); Scott W. Osiecki, Skaneateles, NY (US); Peter C. Castellucci, Syracuse, NY (US)

(73) Assignee: Eveready Battery Co., Inc., St. Louis, MO (US)

( * ) Notice: Subject to any disclaimer, the term of this patent is extended or adjusted under 35 U.S.C. 154(b) by 233 days.

(21) Appl. No.: 11/563,437

(22) Filed: Nov. 27, 2006

(65) Prior Publication Data

US 2008/0122402 A1 May 29, 2008

(51) Int. Cl.
*H01M 10/46* (2006.01)
(52) U.S. Cl. ..................................... 320/107
(58) Field of Classification Search ................. 320/106, 320/107, 111, 114, 115, 132
See application file for complete search history.

(56) References Cited

U.S. PATENT DOCUMENTS

| | | | |
|---|---|---|---|
| 6,078,871 | A | 6/2000 | Anderson |
| 6,184,652 | B1 | 2/2001 | Yang |
| 6,362,610 | B1 | 3/2002 | Yang |
| 6,507,172 | B2 | 1/2003 | Sherman |
| 7,193,865 | B2 | 3/2007 | Balakrishnan et al. |
| 2005/0046391 | A1* | 3/2005 | Veselic et al. ............... 320/133 |
| 2005/0174094 | A1 | 8/2005 | Purdy et al. |
| 2006/0098460 | A1 | 5/2006 | Balakrishnan et al. |

FOREIGN PATENT DOCUMENTS

| | | | |
|---|---|---|---|
| EP | 0711015 | A | 5/1996 |
| EP | 1146621 | A | 10/2001 |
| KR | 10-1999-0077666 | A | 10/1999 |

OTHER PUBLICATIONS

Maxim Integrated Products, Dual -Input, USB/AC adapter, 1-Cell Li+ Charger with OVP and Thermal Regulation, MAX1874, Jul. 2003, p. 1-16, Rev. 0, USA.
Maxim Integrated Products, SOT23 Dual-Input USB/AC Adapter 1-Cell Li+ Battery Charges, MAX1551/MAX1555, Jul. 2003, pp. 1-7, Rev. 0, USA.
Len Sherman, Charge Your Battery Faster By Using a USB Port, Power Electronics Technology, Jan. 2004, pp. 34-40, www.powerelectronics.com.

(Continued)

*Primary Examiner*—Edward Tso
(74) *Attorney, Agent, or Firm*—Gregory J. Adams; Michael C. Pophal (57) ABSTRACT

A physical battery charger (104) connects to a computer (102) using a communications link such as a universal serial bus (USB) connection. Application software (114) resident on the computer (102) presents a virtual battery charger (116) on a display (110) associated with the computer (102). The virtual charger (116) provides information regarding the status of the physical charger (104) and allows the user to control the operation of or otherwise interact with the physical charger (104). The physical charger (104) also adjusts the charging rate of batteries (222) being charged based on the available power.

37 Claims, 7 Drawing Sheets

OTHER PUBLICATIONS

Dallas Semiconductors Maxim, Charging Batteries Using USB Power, Application Note 3241, May 25, 2004, 7 pages, http://www.maxim_ic.com/an3241.

Texas Instruments, Single-Chip Charger and DC/DC Converter IC for Bluetooth Headsets and Other Portable Application (bq2501x), SLUS615A-Dec. 2004-Revised Mar. 2005, 24 pages, www.ti.com.

David Morison, Battery-Charger ICs are Tailored for Latest Applications, Power Electronics Technology, May 2005, pp. 54-55, www.powerelectronics.com.

Instructables Step-by Step Collaboration, Intro MintyBoost!—Small battery-powered USB charger, downloaded on or before Jun. 15, 2006, 33 pages, http://www.instructables.com/ex/i/1686FF3E41011029AC23001143E7E506/?ALLSTEPS....

Wikipedia, The Free Encyclopedia, Universal Serial Bus, page last modified Nov. 10, 2006, 28 pages, http://en.wikipedia.org/wiki/usb_connection.

THNK Geek, Fundue—desktop USB Fondue set main description, downloaded on or before Nov. 12, 2006, 3 pages, http://www.thinkgeek.com/stuff/41/fundue.shtml.

Think Geek, George Foreman USB iGrill main description, downloaded on or before Nov. 27, 2006, 2 pages, http://www.thinkgeek.com/stuff/looflirpa/igrill.shtml.

Patent Cooperation Treaty (PCT), International Search Report and Written Opinion for Application No. PCT/US2007/024133, filed Nov. 19, 2007, mailed Aug. 20, 2008, European Patent Office, Netherlands.

Sanders, Robert. Eliminating "standby" electricity loss from home appliances could save up to 25 percent on electrical bills, study shows, University of California Berkeley press release, Feb. 9, 2001, 3 sheets, http://www.berkeley.edu/news/media/releases/2001/02/09_energ.html.

Philips Semiconductors, USB On-The-Go: A Tutorial, White Paper, Jan. 2002, 9 sheets.

Calwell, et al. Power Supplies: A Hidden Opportunity for Energy Savings, NRDC Report, May 22, 2002, pp. cover page-22.

Alan Meier, Final Report Research Recommendations to Achieve Energy Savings for Electronic Equipment Operating in Lower Power Modes, Sep. 30, 2002, pp. cover sheet-10.

California Energy Commission, California Standards for External Power Supplies, Mar. 3, 2005, 4 sheets.

Power Integeration, TNY 263-268 TinySwitch-II Family Enhanced, Energy Efficient Low Power Off-line switcher, data sheet, Apr. 2005, pp. 1-24.

Friedman, David. Declaring Oil Independence, reprinted from Oct./Nov. 2005 issue of Mother Earth News, Oct. 5, 2005, 2 sheets.

Energy Star, Test Methodology for Determining the Energy Performance of Battery Charging System, Oct. 2005, pp. 1-5.

Fanara, Andrew. Letter from the United States Environmental Protection Agency Office of Air and Radiation, Oct. 17, 2005, 2 sheets.

Anderson, Will. How Much Electricity Do You Waste at Home? A New Meter Reveals The, The (London) Independent, Jun. 21, 2006, 3 sheets.

Power Integrations, TOP242-250 TOPSwitch—GX Family Extended Power, Design Flexible EcoSmart, Integrated Off-line Switcher, data sheet, Nov. 2005, pp. 1-52.

Power Integrations, Recent Technology Enhancements in Reducing Standby Power, presentation, Nov. 2006, slides 1-21, www.powerint.com.

USB-IF, Battery Charging Specification, Mar. 8, 2007, pp. cover page-25, rev. 1.0.

Nokia, Nokia becomes the first phone maker to add energy saving alerts to mobiles, Nokia press release, May 10, 2007, 1 sheet, www.nokia.com.

Energy Star, Energy Star Program Requirements for Products with Battery Charging Systems (BCSs) Draft 2, Eligibility Criteria, downloaded Jul. 24, 2007. pp. 1-9.

Energy Star, Energy Star Program Requirements for Single Voltage External Ac-Dc and Ac-Ac Power Supplies Eligibility Criteria, downloaded Jul. 26, 2007, pp. 1-6, version 1.1.

Chapman, Matt. Carphone Warehouse leads to green charge, Absolute Gadget, Sep. 4, 2007, 1 sheet, http://www.absolutegadget.com/index2.php?option=com_content&task=view&id=753&pop....

Patent Cooperation Treaty (PCT), International Search Report and Written Opinion for Application No. PCT/US2008/009797, Filed Aug. 15, 2008, Mailed Mar. 3, 2009, Korean Patent Office, Republic of Korea.

* cited by examiner

COMMUNICATIVE AND VIRTUAL BATTERY CHARGERS AND METHODS

BACKGROUND

The present application relates to battery chargers.

Recent years have seen a proliferation of battery powered electrical devices. Digital cameras, personal digital assistants (PDAs), hand held games, portable audio players, remote control devices, wireless computer keyboards and mice, and mobile telephones are but a few examples of this trend.

Rechargeable (secondary) batteries, such as nickel-metal hydride (NiMH), nickel-cadmium (NiCd), and lithium ion (LiIon) electrical cells, have likewise gained increasing acceptance as a renewable power source for these and other devices. Rechargeable batteries are typically well-suited for use in relatively high-drain devices, making them attractive in a wide variety of applications. As they can be recharged and reused, rechargeable batteries can also provide convenience and cost advantages relative to non-rechargeable (primary) batteries.

Another trend has been the widespread adoption of the universal serial bus (USB) interface standard. USB ports have become commonplace on personal computers (PCs) such as the so-called "Wintel," Apple Macintosh, and various handheld and laptop computers, with some such PCs containing as many as six (6) or more USB ports. These ports provide bidirectional digital communications functionality and are often used for connecting mice, keyboards, game pads, joysticks, scanners, digital cameras, printers, and other peripheral devices which communicate with a PC.

Devices which exploit the power supply capabilities of USB ports have also been developed. Examples have included USB powered coffee mug warmers, fans, lights, and other devices which do not otherwise utilize the data communication capabilities afforded by the USB standard. Another example of these devices has been USB powered battery chargers. Unfortunately, however, these types of USB powered devices are not USB compliant and, depending on their current draw, may not work with USB compliant ports. In the case of USB powered battery chargers, charging performance may also be compromised.

A USB powered battery charger is also disclosed in U.S. Pat. No. 6,507,172 to Sherman, issued Jan. 14, 2003 and entitled Universal Serial Bus Powered Battery Charger. According to Sherman, the battery charger is intended primarily for use in battery powered hand-held and other devices to charge the battery or batteries within the battery powered device when the device is connected to a host device, powered hub, or a bus powered hub through a USB port. The charger also includes one or more current limits to conform to the USB current supply limit set in the USB specification. More specifically, the charger is incorporated into a system which determines the current capability of the host or powered hub by polling the USB host to determine if the USB is capable of providing 500 milliamps or only 100 milliamps. The battery charging current is selected accordingly.

While such a battery charger may provide certain performance advantages as compared to chargers which do not utilize the communications capabilities afforded by the USB standard, there nonetheless remains room for improvement.

SUMMARY

Aspects of the present application address these matters, and others.

According to a first aspect, a virtual battery charger is operatively connected to a general purpose external communication interface of a computer for communication with a physical battery charger. The virtual battery charger presents information indicative of an operation of the physical battery charger on a display of the computer and receives a user input for interacting with the physical battery charger.

According to another aspect, a computer readable storage medium contains instructions which, when carried out by a computer, causes the computer to carry out a method. The method includes presenting, via a user interface of the computer, information indicative of an operation of a battery charger including a battery receiving region which selectively receives a generally cylindrical battery for charging. The physical battery charger is operatively connected to the computer via a communication interface of the computer. The method also includes using information received from the battery charger via the communication interface to update the presented information.

According to another aspect, an apparatus includes a personal computer and a battery charger. The personal computer includes a user interface and a first communication interface. The battery charger includes a battery receiving region which selectively receives a plurality of batteries for charging, battery contacts which make electrical contact with the terminals of batteries received in the battery receiving region, a second communication interface operatively connected to the first communication interface for data communication therewith, and battery charger circuitry operatively connected to the battery contacts and the second communication interface. The apparatus also includes a computer readable storage medium containing instructions which, when executed by the personal computer, cause the personal computer to display, via the user interface, information indicative of an operation of the battery charger.

According to another aspect, a method includes identifying a device connected to a communication port of a computer, where the communication port is configured for communication with a plurality of different devices. If the connected device is a battery charger, the method also includes presenting a virtual battery charger via a user interface of the computer.

According to another aspect, a method includes sending, via a communication port of a battery charger, digital data which, when received by a host computer operatively connected to the communication port for bidirectional communication with the battery charger, causes the computer to recognize the battery charger as a battery charger. The method also includes receiving, via the communication port, digital data for controlling an operation of the battery charger, and controlling the operation of the battery charger according to the digital data.

According to another aspect, a method includes using electrical energy obtained via a powered communication interface to charge a battery received in a battery receiving region of the battery charger; receiving, via the communication interface, digital data indicative of an energy available via the communication interface; establishing, based on the available energy, a charging energy applied to the battery; and repeating the steps of receiving and establishing a plurality of times.

Those skilled in the art will recognize still other aspects of the present application upon reading and understanding the attached description.

BRIEF DESCRIPTION OF THE DRAWINGS

The present application is illustrated by way of example and not limitation in the figures of the accompanying drawings, in which like references indicate similar elements and in which.

DETAILED DESCRIPTION

Figure 1:
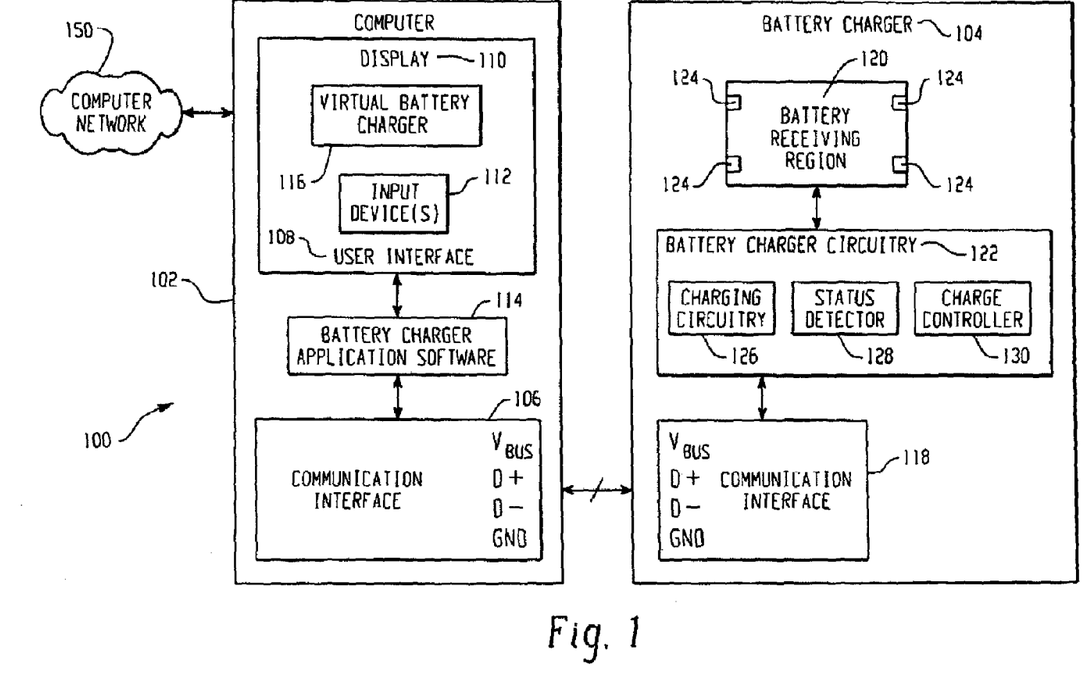
FIG. 1 depicts a system which includes a personal computer and a battery charger.

With reference to FIG. 1, a battery charging system 100 includes a computer 102 and a battery charger 104.

As illustrated, the computer 102 is a conventional PC running the Microsoft® Windows™ or Vista™, Apple® OS X, Linux, or other suitable operating system. For the purposes of the examples below, it will be assumed that the computer is running the Windows XP operating system. Also as illustrated, the computer 102 is connected to a wide area computer network 150 such as the internet.

The computer 102 also includes one or more general purpose communication interfaces 106 such as a USB port. USB ports include positive and negative power lines Vbus, GND which in the case of a powered port supply power to a connected device or devices, and data lines D+, D−. The power lines provide a nominal 5 volts direct current (VDC) supply voltage. In the case of a USB compliant port, the supply current is initially limited to 100 milliamperes (mA). Through a process known as enumeration, a connected device can request additional current in 100 mA increments up to a maximum of 500 mA. If a compliant device requires more power than is available, then it cannot operate until the user changes the network so that the required power is available (for example by disconnecting other USB powered devices) or provides a source of external power (for example by connecting the device to a wall outlet). In practice, however, many ports will deliver the full 500 mA or more, even if the connected device has not identified itself.

The computer 102 also includes a user interface 108 such as a monitor or display 110 and one or more input devices 112 such as a keyboard and/or mouse which allow the user to interact with the computer 102 through a graphical user interface (GUI), and/or an audible indicator such as a beeper or speaker. Also resident on a computer readable storage medium associated with or otherwise accessible to the computer 102 is battery charger application software 114. As will be described further below, the battery charger application software 114 operates in conjunction with the user interface 108 and the communications interface 106 to display the status of or otherwise allow the user to interact with the battery charger 104 through a virtual battery charger 116 which is displayed on the monitor 110.

The battery charger 104 includes a battery receiving region 120 which is configured to selectively receive one or more batteries for charging. In one implementation, the battery receiving region 120 receives one (1) or two (2) generally cylindrical AAA or AA-size secondary batteries, although the battery receiving region 120 may be configured to receive other numbers, sizes, and types of batteries. Battery contacts 124 provide the requisite electrical contact with the terminals of the battery or batteries received in the battery receiving region 120.

The charger 104 also includes battery charger circuitry 122. Charging circuitry 126 supplies electrical energy for charging the battery or batteries received in the battery receiving region 120. A status detector 128 monitors charger 104 status information such as one or more of the number, size, location, state of health, or state of charge of the battery or batteries received in the battery receiving region 120, the battery charging rate, whether the charger 104 is currently charging a battery, or other desired status information. A controller 130 controls the operation of the charger 104, for example to control the charging current supplied by the charging circuitry 126. As will be appreciated by those of ordinary skill in the art, the battery charger circuitry 122 may be implemented using digital circuitry, analog circuitry, microprocessor-based circuitry, or combinations thereof, with the precise configuration and functionality depending on factors such as the number, size, and chemistry of the batteries to be charged, the desired status information, cost, and the like.

As illustrated, the communications interface 118 is implemented as a USB interface which is configured for power and bidirectional data communication with the USB interface 106 of the computer 102 or other host device. The communication interface 118 is also operatively connected to the battery charger circuitry 122 to as to supply electrical energy received from the host device and for exchanging status, control, and other desired information with the computer 102.

It is appreciated that the communications interface 118 is not limited to a USB interface and can include other suitable interfaces. For example, the communications interface 118 can be implemented as a serial type interface, parallel type interface, firewire interface, network interface, and the like.

Figure 2A:
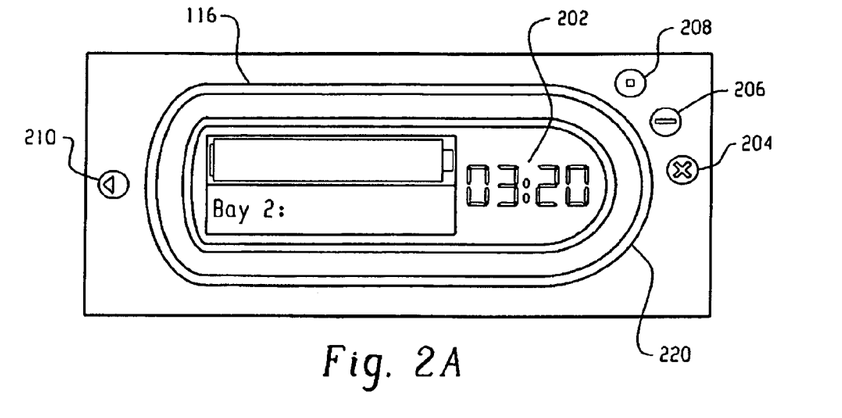
FIGS. 2A and 2B depict a virtual battery charger and a physical battery charger, respectively.
Figure 2B:
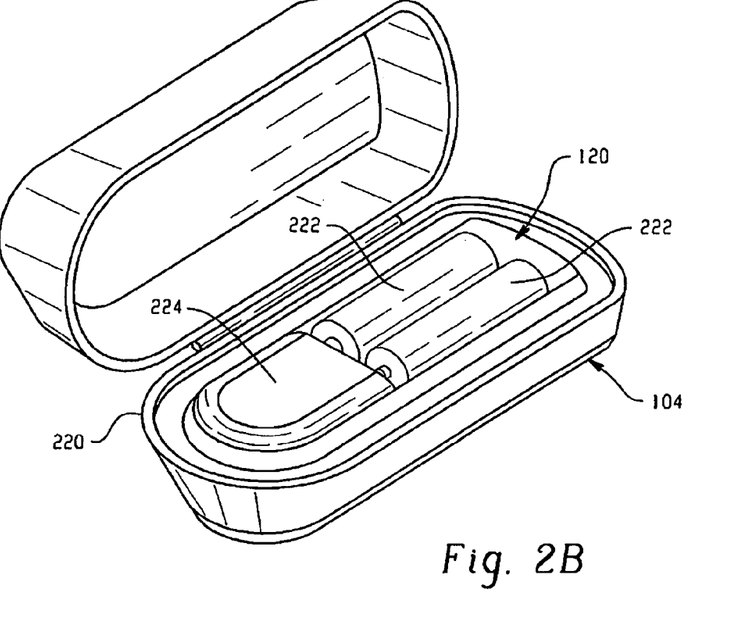

As noted above, the battery charger application software 114 causes a virtual battery charger 116 to be displayed on the monitor 110. An exemplary virtual battery charger 116 is shown in FIG. 2A, and a corresponding physical battery charger is shown in FIG. 2B. As illustrated, the virtual charger 116 is presented in a graphical form, with the form factor and arrangement of the virtual charger 116 and its various elements corresponding to those of the physical battery charger 104. Thus, in the illustrated case, and while the virtual 116 and physical 104 chargers may have different physical sizes, both have a generally rectangular, oblong form factor with rounded ends 220. Moreover, the location and orientation of the battery receiving region 120 of the physical charger 104 generally correspond to those of the virtual charger 116, for example having a major axis which corresponds to a major axis of the physical charger 104 and disposed relatively nearer to a first end. The battery receiving region 120 is also configured to receive one (1) or two (2) AAA or AA size batteries 222 in first and second bays disposed in a side-by-side arrangement. While the physical charger 104 may not include a display such as the display 202 shown on the virtual charger 116, the position of the display 202 advantageously corresponds to a relatively uncluttered or otherwise blank portion 224 of the physical charger 104.

In one example, the battery charger application software 114 provides charger information via non graphical mechanisms. For example, the charger application software 114 can indicate insertion of a battery by an audio indicator or can indicate completion of charging by sending a text message.

It will of course be understood that the foregoing is but one example and that the physical 104 and virtual 116 chargers may take any number of forms, again depending on application-specific factors such as the number and size of the batteries to be charged, desired aesthetics, and the like. While mimicking the form factor of the battery charger 104 and the arrangement of its various elements can ordinarily be expected to facilitate the user's interaction with the system 100, the physical charger 104 and the virtual charger 116 may also take divergent forms. Rather than being presented in a graphical form, the virtual charger 116 may also be presented in a textual, tabular, or other form.

The virtual charger 116 also includes inputs or widgets such as a close button 204, a minimize button 206, a hide button 208, a pull out menu button 210, and a maximize button (not illustrated) which facilitate the user's interaction with the virtual charger 116.

Figure 3A:
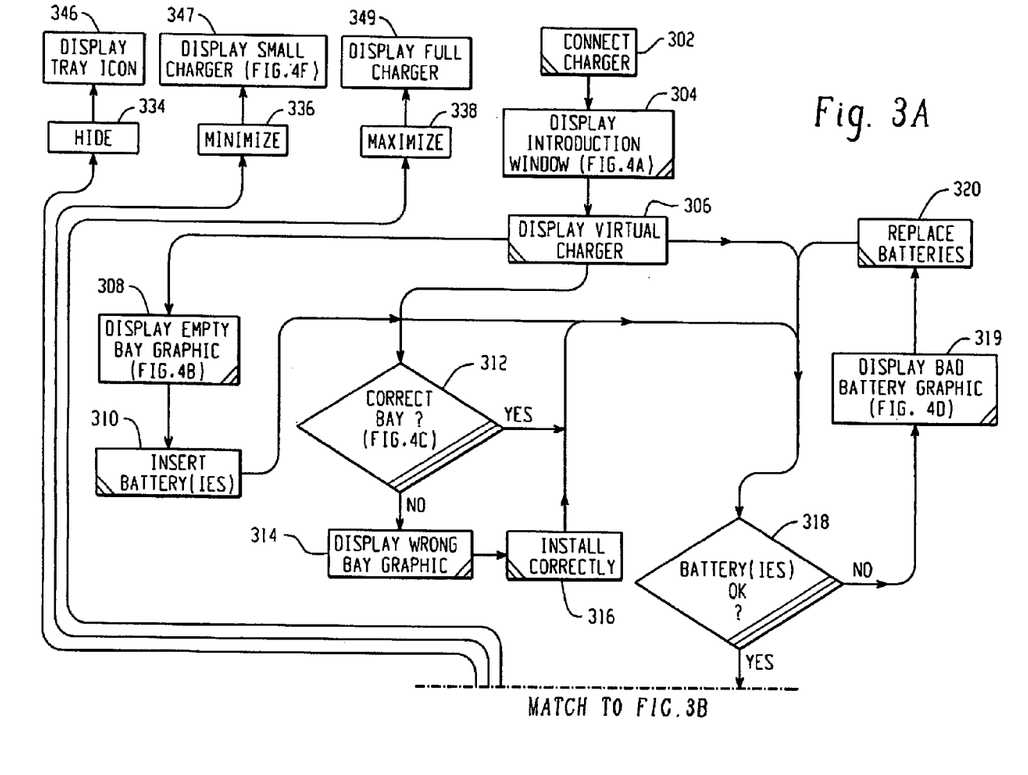
FIG. 3 depicts the operation of virtual battery charger application software.
Figure 3B:
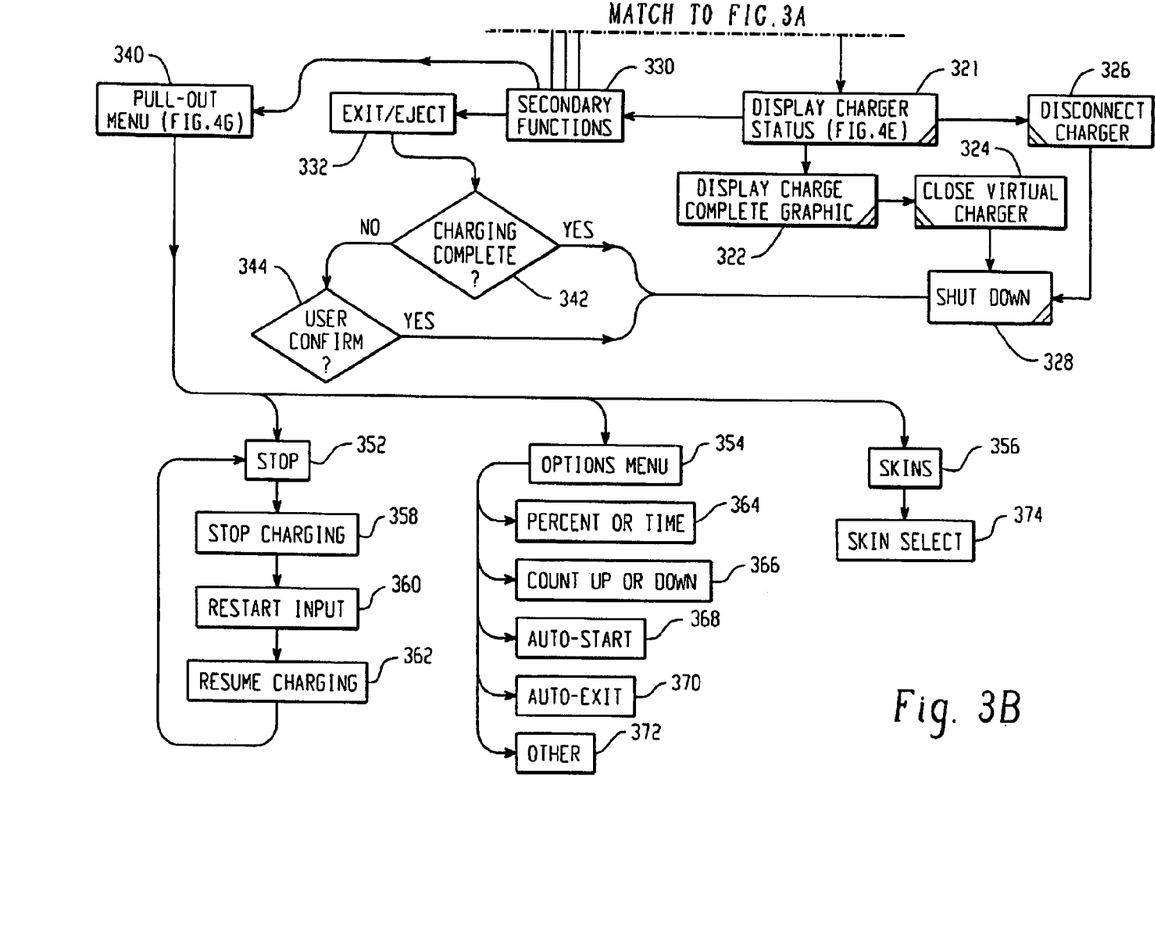

The battery charger application software 114 and the virtual charger 116 will now be described with reference to FIGS. 3 and 4A-4G, again in relation to the exemplary case of a physical charger 104 which accepts either one (1) or two (2) AAA or AA size batteries 222 for charging. In FIG. 3, boxes with hatches in the lower left represent interactions between the user and the physical charger 104, boxes with hatches in the lower right represent automatic functions, and boxes with no hatching represent user inputs functions via the virtual charger 116. In the case of boxes having appended figure numbers, a corresponding appearance of the virtual charger 116 is shown in the identified figure.

At 302, the user connects the physical charger 104 to the computer 102, for example by plugging it the computer's USB port 106, a USB port associated with a powered hub, or into a daisy chained device. The physical charger 104 and the computer 102 undergo an enumeration process through which the physical charger 104 is identified and the various power levels are determined.

Figure 4A:
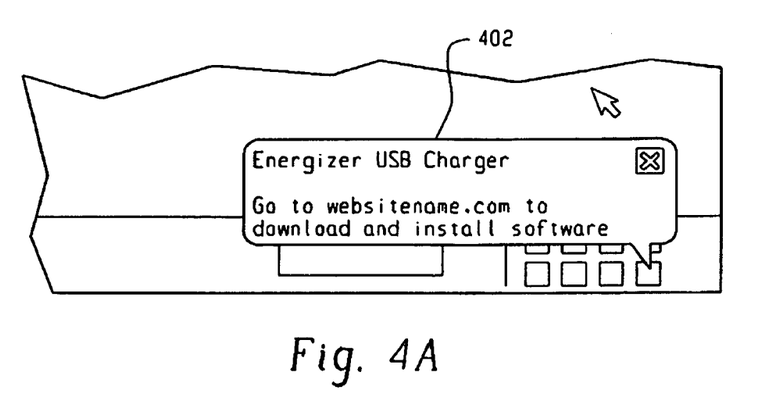
FIGS. 4A-G depict a virtual battery charger.

If the battery charger application software 114 has not yet been installed on the computer 102, an introduction window or animation bubble 402 is displayed at 304 (see FIG. 4A). The user is prompted to install the application software 114, for example by downloading the software 114 from a desired website or providing a disc or other computer readable memory containing the application software 114.

At 306, the virtual charger 116 is displayed, with the appearance of the virtual charger 116 depending on the status of the physical charger 104.

Figure 4B:
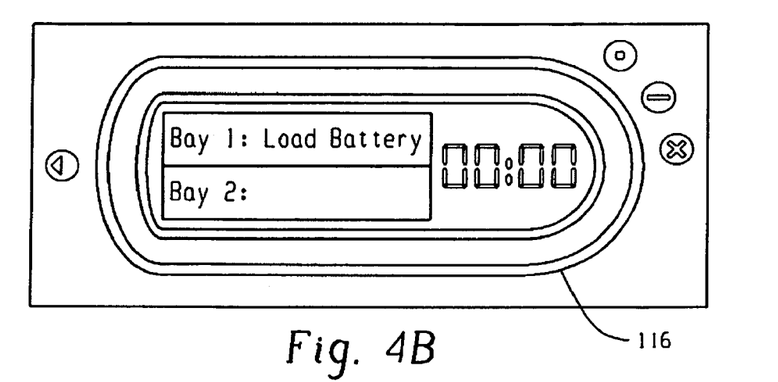

If no batteries have been inserted in the battery receiving region 120 of the physical charger 104, then an empty bay indication is displayed at step 308 (see FIG. 4B). As illustrated, the user is prompted to insert a battery or batteries in the battery receiving region 120 of the physical charger 104, for example by displaying verbiage such as "Load Battery" or by flashing a graphic such as battery symbol and arrow which points to the "Bay x:" verbiage. The user inserts one or more batteries at step 310.

Figure 4C:
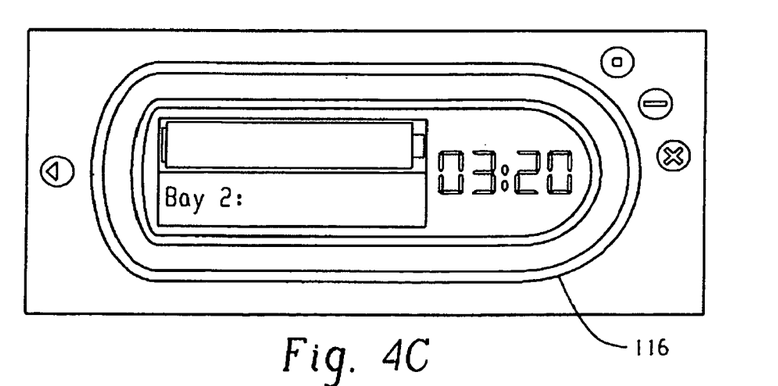
Figure 4D:
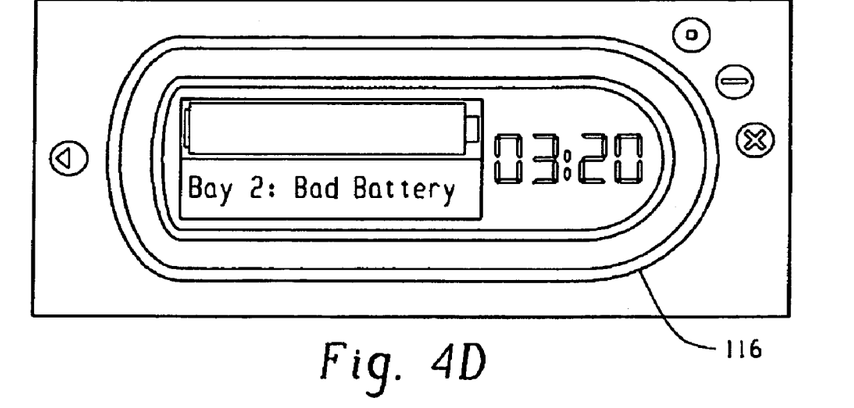

If one (1) battery has been inserted in the battery receiving region of the physical charger 104, then the appearance of the virtual charger 116 depends on whether the battery was installed in the correct bay, as indicated at step 312 (see FIG. 4C). If the battery was installed in the incorrect bay, then a wrong bay graphic or other suitable visible, audible, or other human-perceptible indication is provided at 314. In one implementation, the "Bay 1: Load Battery" verbiage is flashed. In another, a suitable graphic is flashed or otherwise displayed in a manner analogous to that described above in relation to FIG. 4B. The user installs the battery in the correct bay at step 316.

At 318, if one or more batteries have been installed in the correct bay(s), then the appearance of the virtual charger 116 depends on whether the batteries are secondary batteries, and if so, whether they can be charged. If not, the virtual charger 116 displays "Bad Battery" or other suitable indication in the appropriate bay or bays at 319 (see FIG. 4D). At 320, the user replaces the bad battery or batteries. If so, the virtual charger 116 presents the number and location of the batteries (see, e.g., FIGS. 4C and 4E).

Figure 4E:
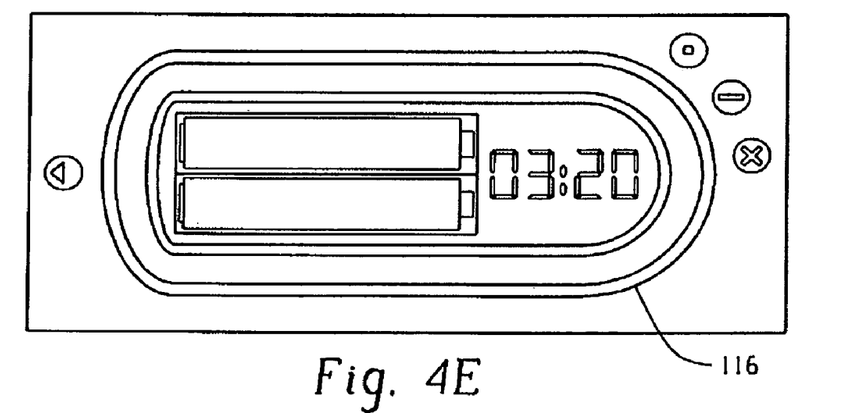

At 321, the virtual charger 116 displays the charging status. As illustrated in FIG. 4E, for example, the display 202 presents an estimate of the remaining charging time, with the estimate being updated as charging progresses. Animated or other effects may also be presented to indicate that charging is in progress.

As indicated at 322, when charging is complete, the virtual charger presents a suitable charge complete indication, for example through a suitable animation or display graphic, an audible indication, or the like. If the user leaves the virtual battery charger 116 open, the charge complete indication continues to be displayed.

If the user exits or closes the virtual charger 116 (as indicated at 324), or if the user disconnects the physical charger 104 from the communications port 106 (as indicated at 326), then the virtual charger 116 is no longer displayed, the tray icon vanishes, and the physical charger turns off as indicated at 328.

Figure 4F:
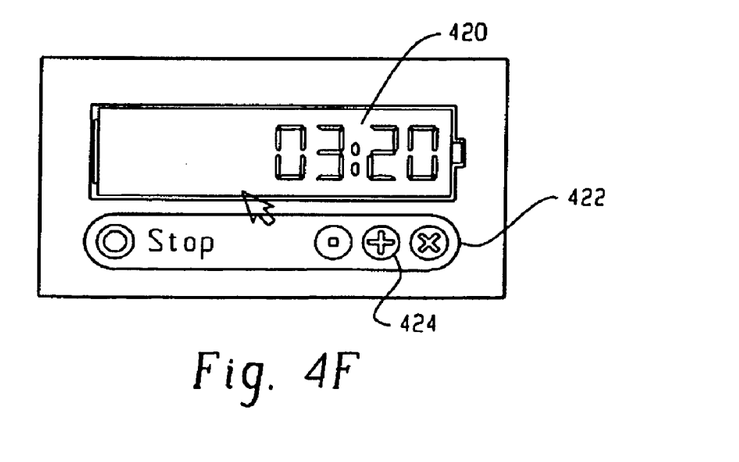
Figure 4G:
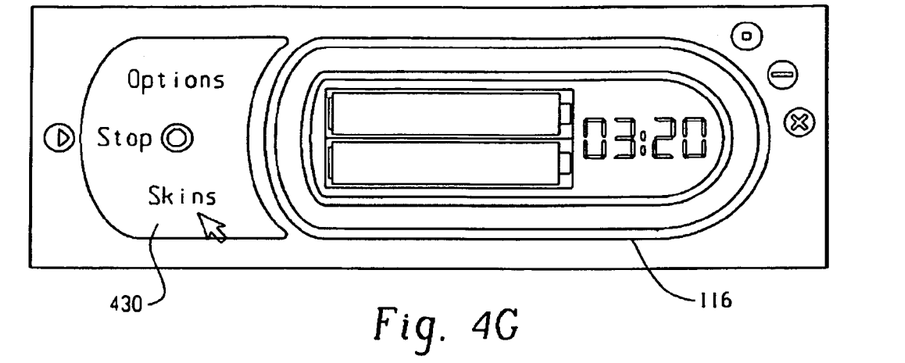

As indicated at 330, the virtual charger 116 also provides one or more secondary functions such as an exit/eject function 332, a hide function 334, a minimize function 336, a maximize function 338, and a pull out menu 340 (see FIG. 4G).

The exit/eject function 332, which can be selected by clicking on the virtual close button 204, allows the user to exit the applications software 114. If charging is incomplete (as indicated at 342), the user is prompted to confirm his or her decision at 344. If the answer is in the affirmative, operation proceeds to step 328.

The hide function 334, which is selected by clicking on the virtual hide button 208, allows the user to hide the virtual charger 116. If selected, only a tray icon is displayed as indicated at 346.

The minimize function 336, which can be selected by clicking on the virtual minimize button 206, causes a smaller version 420 of the virtual charger 116 to be displayed (as indicated at 347; see FIG. 4F). Rolling or mousing over the smaller version 420 causes a toolbar 422 to open. In the case of an error, the toolbar 422 is automatically displayed to indicate the error condition (e.g., a bad battery). As indicated at 338, the user may also elect to display the full virtual charger 116 by selecting the virtual maximize button 424, in which case the full virtual charger 116 is displayed at 349.

The secondary functions 330 may also be accessed via the virtual pull out menu button 210. Where selected, a pullout menu 430 is displayed. As illustrated, the user may select functions such as stop 352, a pull-down options menu 354, and skins 356.

Selecting the stop function 352 causes the physical charger 104 to stop charging (as indicated at 358), whereupon the user may elect to restart or toggle charging via an appropriate virtual button as indicated at 360, whereupon charging resumes at 362.

Selecting the options menu 354 allows the user to configure the virtual charger 116. For example, configuration options include the operation of the display 202, for example by selecting whether charging time is displayed as a time or percentage as indicated at 364, whether the display counts up or down at 366. Other options include an auto-start function 368 which, if enabled, causes charging to begin automatically when the physical charger 104 is connected to the communication port 106 and an auto-exit function 370 which automatically closes the application software 114 when charging is complete. Still other configuration options 372 may also be implemented.

Selecting the skins menu 356 allows the user to customize the appearance of the virtual charger 116, for example by selecting a skin having a desired color and/or pattern as indicated at 374.

Figure 5:
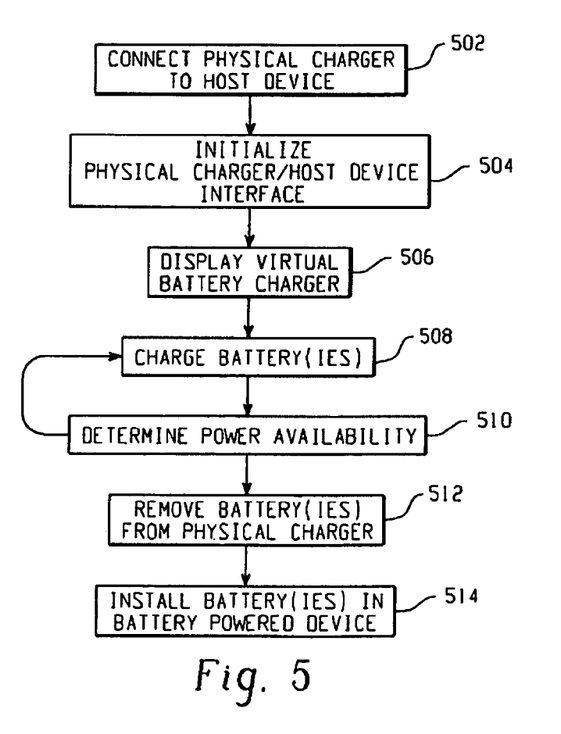
FIG. 5 depicts a battery charging method.

Operation will now be further described with reference to FIG. 5.

At 502, the physical battery charger 104 is connected to the computer 102 or other host device, for example via a USB port.

At 504, the physical battery charger/host device interface is initialized at step 104. In the exemplary case of a USB port, the connected device is identified as a battery charger, and the available power is determined via the USB enumeration process. Thus, in the case of a port and physical charger which conform to the USB standard, the power may be initialized to 100 mA and increased in one or more increments up to a maximum 500 mA.

The virtual battery charger 116 is displayed at 506, and the user interacts with the physical 104 and virtual 116 chargers as desired. Thus, for example, the user may insert one or more batteries in the battery receiving region 120 of the physical charger 104, configure the virtual charger 116 as desired, and initiate charging. Where the application software 114 has not yet been installed on the computer 102 or other host device, the user is prompted to install it, again for example via download over the internet or from a disk suitable computer readable memory.

The batteries are charged at 508. Note that charging may be performed concurrently with other interactions between the user and the virtual charger 116.

The available energy is determined at step 510. Thus, in the exemplary case of a USB port, the computer 102 may be polled from time to time to determine the available current, with the operation of the physical charger 104 adjusted accordingly. As one example, the initialization performed at step 504 may have determined that 100 mA was available from the port 106. In an intervening period, however, the user may have decided to remove another USB powered device so that port 106 can supply 500 mA. In such as case, the charging energy supplied to the batteries may be increased accordingly. As will be appreciated, such an arrangement allows the charging rate to be dynamically adjusted, thereby having the potential to reduce the battery charging time.

The user removes the battery or batteries from the physical charger at 512 and installs the batteries in a desired battery powered appliance at step 514.

Still other variations are contemplated. For example, while the above discussion has focussed on a standalone physical battery charger 104, the physical battery charger 104 may be incorporated in a battery powered appliance (e.g., a mobile phone, PDA, game, or the like) which otherwise includes a compatible communication interface 106.

While a USB port is a particularly advantageous communication interface, still other serial or parallel communication interfaces may be implemented. In this regard, it should be noted that the interface 106 need not be a powered communication interface; the battery charger 104 may additionally or alternatively be powered from an external power source (e.g., via the alternating current power mains). Data communications with the computer 102 may also be provided via a wireless communication interface. Preferably, however, the communication interface is a general purpose external communication interface which, for the purposes of the present application, is defined as a communication interface which is designed to allow a plurality of different devices to be selectively connected to the interface for data communication with the computer.

The application software 114 may provide alternative, additional, or a subset of the above-described functionality. In one such variation, the close 204, minimize 206, and hide 208 buttons are eliminated, as are the minimize 336 and stop 352 functions. As another example, the auto-start 368 and auto-exit 370 or other desired subset of the options menu 354 may be provided. In the latter case, for example, the state of charge information may be provided as a timer based or otherwise as a countdown function.

As still another variation, operation of the physical battery charger 104 does not depend on the presence of the battery charger application software 114. Thus, for example, the physical charger may be configured to charge the battery(ies) received in the battery receiving region even if the battery charger application software 114 is not installed, is not running, or has been closed by the user.

Operation of the virtual charger 116 may also be reorganized. In one such example, the hide function 334 is accessed through the pullout menu 340. In another variation, the pullout menu contains a link to a desired website, for example to a website of a physical charger 104 or battery manufacturer. Following the link opens a web browser and directs to the user to the applicable web site, which may include information such as one or both of instructions for operation the physical 104 and/or virtual 116 battery chargers, updates to or upgrades of the battery charger application software 114 which are available for download, or other information.

Moreover, it will be appreciated that the functionality of the application software 114 is likewise a function of the functionality and capabilities of the physical charger 104. Some of all of the functionality may also be provided via a user interface provided on the physical charger 104.

Note that the application software 114 may also be carried in a computer memory contained in the physical battery charger 104. In still another variation, the virtual charger 116 may be accessed remotely, for example over the computer network 150 via a suitable web or other interface.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A virtual battery charger operatively connected to a general purpose external communication interface of a computer for communication with a physical battery charger, wherein the virtual battery charger presents information indicative of an operation of the physical battery charger on a display of the computer and receives a user input for interacting with the physical battery charger and wherein the virtual battery charger has a form factor and arrangement corresponding to those of the physical battery charger.

2. The virtual battery charger of claim 1 wherein the communication interface is a serial bidirectional interface.

3. The virtual battery charger of claim 1 wherein the communication interface is a universal serial bus interface.

4. The virtual battery charger of claim 1 wherein the virtual battery charger includes a graphical representation of a battery charger.

5. The virtual battery charger of claim 1 wherein the computer includes a graphical user interface and the virtual battery charger presents the information and receives the user input via the graphical user interface.

6. The virtual battery charger of claim 1 wherein the virtual battery charger instructs a user to insert a battery in a battery receiving region of the physical battery charger.

7. The virtual battery charger of claim 1 wherein the presented information includes information that a battery has been incorrectly inserted in a batter receiving region of the physical battery charger.

8. The virtual battery charger of claim 1 wherein the presented information includes the number of batteries disposed in a battery receiving region of the physical battery charger.

9. The virtual battery charger of claim 1 wherein the virtual battery charger is automatically displayed when the physical charger is connected to the communication interface.

10. The virtual battery charger of claim 1 wherein the user input includes a stop charging command and a start charging command.

11. The virtual battery charger of claim 1 wherein the virtual battery charger includes a plurality of user selectable skins, whereby the user can alter an appearance of the virtual battery charger.

12. The virtual battery charger of claim 1 wherein the virtual battery charger provides an audible indication of an operation of the physical battery charger.

13. The virtual battery charger of claim 1 wherein the physical battery charger receives a plurality of AA size batteries for charging.

14. A computer readable storage medium containing instructions which, when carried out by a computer, causes the computer to carry out a method comprising:
   presenting, via a user interface of the computer, information indicative of an operation of a physical battery charger including a battery receiving region which selectively receives a generally cylindrical battery for charging, wherein the battery charger is operatively connected to the computer via a communication interface of the computer;
   presenting virtual elements via the user interface that correspond to element of the physical battery charger; and
   using information received from the battery charger via the communication interface to update the presented information and the presented virtual elements.

15. The computer readable storage medium of claim 14 wherein the battery charger obtains energy for charging the battery via the interface.

16. The computer readable storage medium of claim 14 wherein the communication interface is a USB interface.

17. The computer readable storage medium of claim 14 wherein the computer is a personal computer.

18. The computer readable storage medium of claim 14 wherein the user interface is a graphical user interface.

19. The computer readable storage medium of claim 14 wherein presenting includes presenting a graphical representation of the battery charger.

20. The computer readable storage medium of claim 14 wherein the information includes a state of charge of a battery received in the battery receiving region.

21. The computer readable storage medium of claim 20 wherein presenting includes presenting the state of charge in a format selected by the user via the user interface, wherein the format is selected from a group which includes a percentage and a time.

22. The computer readable storage medium of claim 14 wherein the method includes receiving, via the operator interface, a user input indicative of a desired operation of the battery charger and communicating the desired operation to the battery charger via the communication interface.

23. The computer readable storage medium of claim 14 wherein the method includes receiving, via the operator interface, a user input indicative of a desired presentation of the information, wherein the desired presentation is selected from a group which includes a first presentation which includes a graphical representation of the battery charger and a second presentation.

24. An apparatus comprising:
   a personal computer comprising
      a user interface including a virtual charger;
      a first communication interface;
   a battery charger comprising:
      a battery receiving region which selectively receives a plurality of batteries for charging;
      battery contacts which make electrical contact with the terminals of batteries received in the battery receiving region;
      a second communication interface operatively connected to the first communication interface for data communication therewith;
      battery charger circuitry operatively connected to the battery contacts and the second communication interface; and
      the battery charger having a form factor and arrangement corresponding to those of the virtual battery charger;
   a computer readable storage medium containing instructions which, when executed by the personal computer, cause the personal computer to display, via the user interface, information indicative of an operation of the battery charger.

25. The apparatus of claim 24 wherein the computer readable storage medium contains instructions which, when executed by the personal computer, cause the personal computer to display, via the user interface, a graphical representation of the battery charger.

26. The apparatus of claim 24 wherein the computer readable storage medium contains instructions which, when executed by the personal computer, cause the personal computer to receive a user input indicative of a desired operation of the battery charger and to communicate the desired operation to the battery charger via the first communication interface.

27. The apparatus of claim 24 wherein the information includes a state of charge of a battery received in the battery receiving region.

28. The apparatus of claim 24 wherein the first communication interface is a USB port.

29. The apparatus of claim 24 wherein the battery receiving region receives at least first and second batteries selected from a group which includes AA and AAA size batteries.

30. A method comprising:
   identifying a device connected to a communication port of a computer, wherein the communication port is configured for communication with a plurality of different devices;
   if the connected device is a physical battery charger, presenting a virtual battery charger via a user interface of the computer;
   determing whether battery charger application software is present on the storage medium; and
   if the battery charger application software is not present storing the battery charger application software on the computer readable storage medium.

31. The method of claim 30 including receiving the battery charger application software from the internet.

32. The method of claim 30 wherein the virtual battery charger includes a graphical representation of the physical battery charger, and wherein the graphical representation has a form factor which corresponds to a form factor of the physical battery charger.

33. The method of claim 30 wherein the physical battery charger includes a battery receiving region which receives a plurality of batteries for charging and the method includes receiving, via the communication port, information indicative of the number and location of batteries received in the battery receiving region.

34. The method of claim 33 wherein the method includes receiving, via the communication port, information indicative of a state of charge of a battery received in the battery receiving region.

35. The method of claim 30 including sending, via the communication port, a command for controlling an operation of the physical battery charger.

36. The method of claim 30 wherein the physical battery charger is powered from energy received from the communication port.

37. The method of claim 30 including obtaining at least one of operating instructions for the physical battery charger, operating instructions for the virtual battery charger, or an updated version of battery charger application software over a wide area computer network.

* * * * *